United States Patent [19]

Forsting et al.

[11] Patent Number: 4,533,081
[45] Date of Patent: Aug. 6, 1985

[54] HEATING AND VENTILATION SYSTEM FOR VEHICLES

[75] Inventors: Bernd Forsting, Monchen-Gladbach; Joachim Zander, Frechen; Jeske Gustav, Pulheim, all of Fed. Rep. of Germany

[73] Assignee: Ford Motor Company, Dearborn, Mich.

[21] Appl. No.: 529,820

[22] Filed: Sep. 6, 1983

[30] Foreign Application Priority Data

Nov. 15, 1982 [DE] Fed. Rep. of Germany ....... 3242246

[51] Int. Cl.³ ............................................. B60H 1/02
[52] U.S. Cl. .................................. 237/12.3 B; 165/78
[58] Field of Search ............. 165/78, 41; 237/12.3 A, 237/12.3 B, 12.3 R; 98/2, 2.05, 2.08

[56] References Cited

U.S. PATENT DOCUMENTS 2,623,735 12/1952 Schofield et al. .................... 98/2.06

Primary Examiner—Henry Bennett
Attorney, Agent, or Firm—Daniel M. Stock; Clifford L. Sadler

[57] ABSTRACT

A heating and ventilation unit for a motor vehicle comprises a mixing chamber containing a heat exchanger and disposed within the vehicle interior. Pipe connections extending from the heat exchanger pass through the rear wall of the mixing chamber. An aperture in a wall of the mixing chamber is provided for enabling the heat exchanger to be withdrawn from the mixing chamber into the vehicle interior. The aperture is formed in a side wall of the chamber and is dimensioned to permit passage of the heat exchanger as well as the rearwardly projecting connections. A closure and support element is provided which is insertable through the aperture and which, when inserted, serves to support the heat exchanger within the chamber and prevent forward displacement of the exchanger away from the rear wall of the mixing chamber.

1 Claim, 3 Drawing Figures

HEATING AND VENTILATION SYSTEM FOR VEHICLES

BACKGROUND OF THE INVENTION

The invention relates to a heating and ventilation system for a vehicle.

A known heating and ventilation unit is disclosed in German Patent Application No. P 31 37 771.8, in which the heat exchanger may be replaced through an aperture directed downwardly relative to the interior of the vehicle.

In this known heating and ventilation unit, it is possible to replace the heat exchanger in a simple and rapid manner only if the vehicle has a relatively small transmission tunnel. In a vehicle with a larger transmission tunnel, for example a rear wheel drive vehicle, there are drawbacks in arranging an installation flap to be opened rearwardly for the heat exchanger to be replaced.

SUMMARY OF THE INVENTION

In accordance with the present invention, there is provided a heating and ventilation unit for a motor vehicle, comprising a mixing chamber containing a heat exchanger disposed within the vehicle interior, pipe connections extending from the heat exchanger through the rear wall of the mixing chamber and an aperture in a wall of the mixing chamber for enabling the heat exchanger to be withdrawn from the mixing chamber into the vehicle interior. The aperture is formed in a side wall of the chamber and is dimensioned to permit passage of the heat exchanger and the rearwardly projecting connections, and a closure and support element is provided which is insertable through the aperture and which, when inserted, serves to support the heat exchanger within the chamber and prevent forward displacement of the exchanger away from the rear wall of the mixing chamber.

By employing a support and closure element for the heat exchanger, it is possible to enable a simple and rapid replacement of the heat exchanger in the vehicle interior even if there is little space below the heating and ventilation system because of the existence of a deep transmission tunnel.

Conveniently, the support and closure element comprises a support wall maintaining the heat exchanger in an installed position and a closure wall fixedly attached to one end of the support wall and closing part of the aperture.

Preferably, the portion of the support wall remote from the closure wall is provided with a catch which engages with a corresponding recess in the housing, thereby maintaining the support and closure element in its installed position.

By providing a catch it is possible to permit the catch to be released by a screwdriver or like tool, thereby further simplifying the replacement of a heat exchanger.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
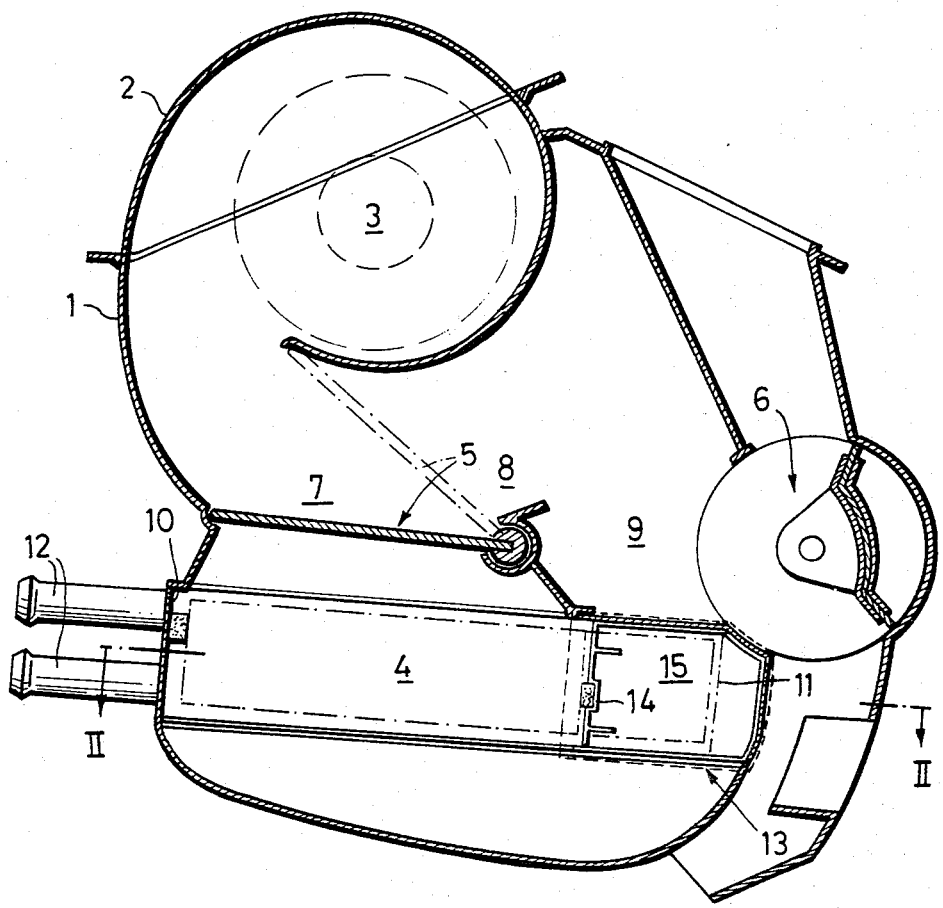
FIG. 1 is a vertical section through a heating and ventilation system for a motor vehicle.
Figure 2:
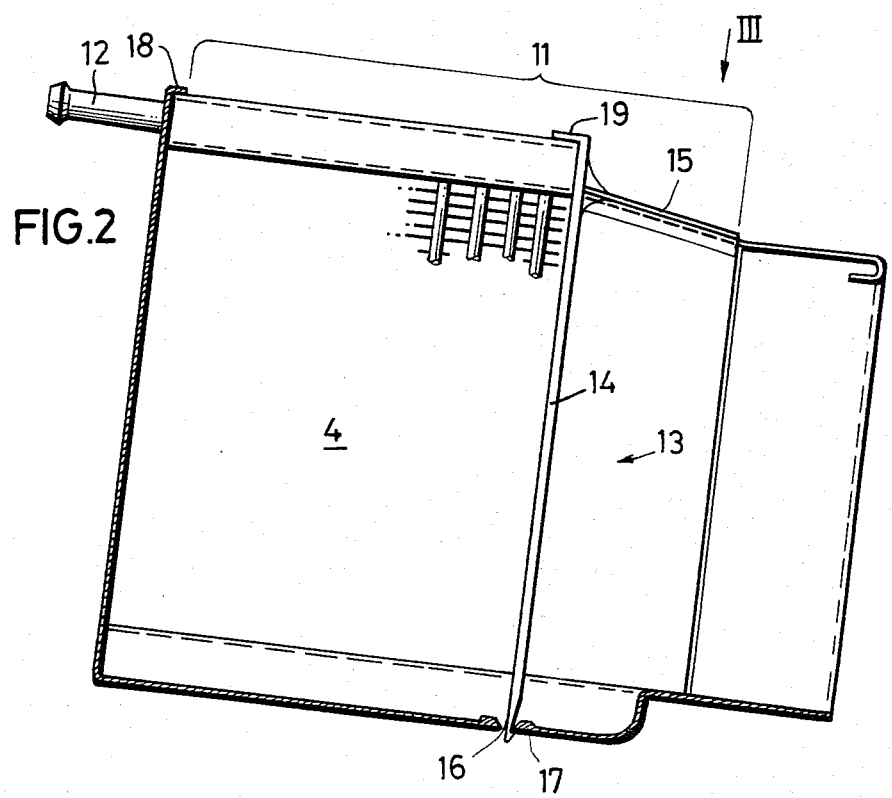
FIG. 2 is a section along the line II—II of FIG. 1.
Figure 3:
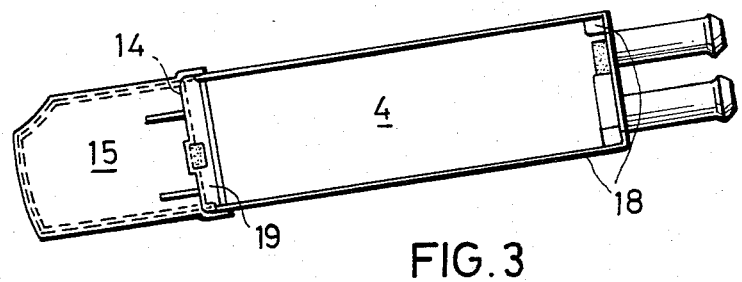
FIG. 3 is a view in the direction of the arrow III in FIG. 2.

The heating and ventilation unit for motor vehicles shown in the Figures comprises two housing portions 1 and 2, a fan 3, a heat exchanger 4, a mixing flap 5 and a distributor flap 6. The housing portion 1 defines a heat exchanger duct 7 and a bypass duct 8 which meet in a mixing chamber 9 in which the distributor flap 6 is disposed. A receptacle 10 receives the heat exchanger 4 and has on one side a rectangular aperture 11 whose dimensions correspond approximately to the length of the heat exchanger 4 with its pipe connections 12.

To mount the heat exchanger 4 in position, it may be slid in laterally from the side of the receptacle 10 through the aperture 11, and when disposed within the interior of the receptacle, it may be slid rearwardly so that its pipe connections 12 penetrate through corresponding apertues in the bulkhead. In this installed position the heat exchanger 4 is supported in the receptacle 10 of the housing 1. At its front end the heat exchanger 4 is supported by a support and closure element 13 which comprises a support wall 14 and closure wall 15. At the free end of the support wall 14 there is formed a catch 16 which engages with a corresponding slot 17 in the housing portion 1 in order to maintain the support and closure element 13 in its installed position.

In the embodiment illustrated, the aperture 11 in the housing portion 1 is only partially closed by the closure wall 15. The majority of the aperture 11 is in this case closed by the header tank of the installed heat exchanger 4. However, this portion of the aperture 11 may alternatively be closed by a closure wall if desired. In the case of the present embodiment, the header tank of the heat exchanger 4 is fixed to the housing portion 1 by lugs 18 and to the support and closure element 13 by a holding edge 19.

During initial installation of the heating and ventilation unit, the entire pre-assembled heating and ventilation unit may be mounted in a conventional manner below the dashboard, the connection pieces being passed through the bulkhead and connected with corresponding heater hoses.

If during operation of the vehicle the heating and ventilation system fails as a result of a defective heat exchanger, it is not necessary to dismantle the entire heating and ventilation system in order to replace the heat exchanger. Instead, it is merely necessary to release the catch 16 of the support and closure element 14, for example by means of a screwdriver, and to withdraw this element laterally from the receptacle 10. After the hose connections have been disconnected from within the engine compartment, the heat exchanger may be moved forward in the receptacle 10 and then moved laterally to withdraw it from the receptacle 10 into the foot well of the passenger compartment. A new or reconditioned heat exchanger may be then inserted and mounted in the reverse sequence.

What is claimed is:

1. A heating and ventilation unit for a motor vehicle comprising a mixing chamber having a housing containing a heat exchanger disposed within the vehicle interior, pipe connections extending from the heat exchanger through the rear wall of the mixing chamber and an aperture in a wall of the mixing chamber for enabling the heat exchanger to be withdrawn from the mixing chamber into the vehicle interior, wherein the aperture is formed in a side wall of the chamber and is dimensioned to permit passage of the heat exchanger and the rearwardly projecting connections, and a closure and support element is provided which includes portions insertable through the aperture and which, when inserted, is operative to support the heat exchanger within the chamber and prevent forward displacement of the exchanger away from the rear wall of the mixing chamber, the support and closure element including a support wall maintaining the heat exchanger in an installed position and a closure wall fixedly attached to one end of the support wall and closing at least part of the aperture, and wherein the other end of the support wall is provided with a catch and the housing is provided with a slot and the catch engages with the slot to maintain the support and closure element in its installed position.

* * * * *